United States Patent
Zhou (10) Patent No.: US 11,514,368 B2
(45) Date of Patent: Nov. 29, 2022

(54) METHODS, APPARATUSES, AND COMPUTING DEVICES FOR TRAININGS OF LEARNING MODELS

(71) Applicant: Advanced New Technologies Co., Ltd., Grand Cayman (KY)

(72) Inventor: Jun Zhou, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/246,201

(22) Filed: Apr. 30, 2021

(65) Prior Publication Data

US 2021/0256423 A1  Aug. 19, 2021

Related U.S. Application Data

(63) Continuation of application No. PCT/CN2020/073834, filed on Jan. 22, 2020.

(30) Foreign Application Priority Data

Mar. 29, 2019 (CN) .......................... 201910250563.9

(51) Int. Cl.
*G06N 20/00* (2019.01)
(52) U.S. Cl.
CPC .................................... *G06N 20/00* (2019.01)
(58) Field of Classification Search
CPC ....................................................... G06N 20/00
See application file for complete search history.

(56) References Cited

U.S. PATENT DOCUMENTS

| | | | |
|---|---|---|---|
| 2015/0206064 A1 | 7/2015 | Levman | |
| 2017/0300814 A1* | 10/2017 | Shaked | G06N 3/0454 |
| 2020/0035219 A1* | 1/2020 | Ward | G10L 15/30 |
| 2020/0287814 A1* | 9/2020 | Zhao | H04L 41/5009 |

FOREIGN PATENT DOCUMENTS

| | | |
|---|---|---|
| CN | 105608219 | 5/2016 |
| CN | 107070940 | 8/2017 |
| CN | 107452023 | 12/2017 |
| CN | 107506590 | 12/2017 |
| CN | 107707541 | 2/2018 |
| CN | 107944376 | 4/2018 |
| CN | 108010321 | 5/2018 |
| CN | 108053080 | 5/2018 |

(Continued)

OTHER PUBLICATIONS

Nguyen, Duong, et al. "A multi-task deep learning architecture for maritime surveillance using ais data streams." 2018 IEEE 5th International Conference on Data Science and Advanced Analytics (DSAA). IEEE, 2018. (Year: 2018).*

(Continued)

*Primary Examiner* — Kevin W Figueroa
(74) *Attorney, Agent, or Firm* — Fish & Richardson P.C.

(57) ABSTRACT

Current streaming sample data is received. A current deep learning model is trained based on the current streaming sample data, the training including: obtaining a shallow learning model through training based on historical sample data associated with the current streaming sample data; and initializing parameters of the current deep learning model as the parameters of the shallowing learning model.

20 Claims, 4 Drawing Sheets

(56) References Cited

FOREIGN PATENT DOCUMENTS

| CN | 108520197 | 9/2018 |
|----|-----------|--------|
| CN | 108829684 | 11/2018 |
| CN | 109102126 | 12/2018 |
| CN | 109344959 | 2/2019 |
| CN | 110059802 | 7/2019 |

OTHER PUBLICATIONS

Sahoo, Doyen, et al. "Online deep learning: Learning deep neural networks on the fly." arXiv preprint arXiv:1711.03705 (2017). (Year: 2017).*
Alumäe, Tanel, Stavros Tsakalidis, and Richard M. Schwartz. "Improved Multilingual Training of Stacked Neural Network Acoustic Models for Low Resource Languages." Interspeech. 2016. (Year: 2016).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2020/073834, dated Apr. 21, 2020, 11 pages (with partial English translation).
PCT International Preliminary Report on Patentability in International Application No. PCT/CN2020/073834, dated Sep. 28, 2021, 13 pages (with English translation).
Chung et al., "A Recurrent Latent Variable Model for Sequential Data," Apr. 2016, arXiv:1506.02216v6 [cs.LG], 9 pages.
Extended European Search Report in European Application No. 20781 845.1, dated May 9, 2022, 10 pages.
Li et al., "DeepCham: Collaborative Edge-Mediated AdaptiveDeep Learning for Mobile Object Recognition", Oct. 2016, 2016 IEEE/ACMSYMPOSIUM on Edge Computing (SEC), IEEE, pp. 64-76, XP033018397, DOI: 10.1109/SEC.2016.38.
Lou et al., "Comprehensive Evaluation of Competitiveness ofListed Companies Using Artificial Neural Network," Nov. 2010, E-Product ESERVICEAND E-Entertainment (ICEEE), 2010 INTERNATIONALCONFERENCE on, IEEE, pp. 1-4, XP031829176, ISBN: 978-1-4244-7159-1.
Xu et al., "DeepType," Dec. 2018, Proceedings of the ACM ONINTERACTIVE, Mobile, Wearable and UBIQUITOUSTECHNOLOGIES, vol. 2, No. 4, pp. 1-26, XP058422398, DOI: 10.1145/3287075.

* cited by examiner

METHODS, APPARATUSES, AND COMPUTING DEVICES FOR TRAININGS OF LEARNING MODELS

CROSS-REFERENCE TO RELATED APPLICATIONS

This application is a continuation of PCT Application No. PCT/CN2020/073834, filed on Jan. 22, 2020, which claims priority to Chinese Patent Application No. 201910250563.9, filed on Mar. 29, 2019, and each application is hereby incorporated by reference in its entirety.

TECHNICAL FIELD

Embodiments of the present specification relate to the field of machine learning, and specifically, to methods, apparatuses, and computing devices for trainings of learning models.

BACKGROUND

Deep learning originates from the research of artificial neural networks, it's a new field of machine learning research in recent years, and has wide application prospects in various fields. Currently, in most deep learning methods, a deep learning model (which can be also referred to as a deep neural network) is usually trained in a batch learning way. In this way, training data sets usually need to be prepared before a learning task starts (i.e., offline training).

However, in many current applications, data may arrive successively in a form of stream, and therefore the batch learning way may not be very practical for such applications.

SUMMARY

Considering the previously described problem in the existing technology, embodiments of the present specification provide methods, apparatuses, and computing devices for trainings of learning models.

According to an aspect, embodiments of the present specification provide a method for trainings of learning models, including the following: current streaming sample data is received; and a current deep learning model is trained based on the current streaming sample data, where parameters of a shallow learning model are used as initialization parameters of the current deep learning model, and the shallow learning model is obtained through training based on historical sample data associated with the current streaming sample data.

According to another aspect, embodiments of the present specification provide an apparatus for trainings of learning models, including: a receiving unit, configured to receive current streaming sample data; and a training unit, configured to train a current deep learning model based on the current streaming sample data, where parameters of a shallow learning model are used as initialization parameters of the current deep learning model, and the shallow learning model is obtained through training based on historical sample data associated with the current streaming sample data.

According to another aspect, embodiments of the present specification provide a computing device, including at least one processor; and a storage that communicates with the at least one processor, where an executable instruction is stored in the memory, and the at least one processor is enabled to implement the previously described method when the executable instruction is executed by the at least one processor.

It can be seen that in the technical solutions, when the current deep learning model is trained based on the current streaming sample data, the parameters of the trained shallow learning model are used as the initialization parameters of the current deep learning model, so that convergence of the deep learning model can be accelerated to efficiently finish a model training process, and performance of the deep learning model can also be improved.

BRIEF DESCRIPTION OF DRAWINGS

The following further describes the previously described characteristics, technical features, advantages, and implementations of the present invention in a clear and easy-to-understand way by describing preferred embodiments and with reference to the accompanying drawings.

DESCRIPTION OF IMPLEMENTATIONS

At present, the subject described here is discussed with reference to embodiments. It is worthwhile to understand that the discussion of these embodiments is merely intended to enable a person skilled in the art to better understand and implement the subject described here, and is not intended to limit the protection scope, applicability, or examples described in the claims. The functions and arrangements of the discussed elements can be changed without departing from the protection scope of the claims. In the embodiments, various processes or components can be omitted, replaced, or added as required.

Currently, a deep learning model is usually trained in a batch learning way. In the batch learning way, training data sets usually need to be prepared before a learning task starts, and then these training data sets are used to train the deep learning model (i.e., offline training). However, in some applications, data may arrive successively in a form of stream, and therefore the batch learning way may not be very suitable for such applications. In addition, in the batch learning way, the training data sets prepared in advance may occupy relatively large storage space, and therefore the batch learning way is also not suitable for some scenarios with limited storage space.

The embodiments of the present specification provide technical solutions for training a learning model based on streaming sample data. In the present specification, the streaming sample data usually can include sample data continuously generated from a data sample source, for example, log files, online shopping data, game player activity data, and social networking site information data generated by a web application. The streaming sample data can also be referred to as real-time sample data whose time span is usually between hundreds of milliseconds and several seconds. Model training performed based on the streaming sample data usually can also be considered as online learning.

Specifically, in the technical solutions of the present specification, current streaming sample data can be received. Then, a current deep learning model can be trained based on the current streaming sample data. Parameters of a shallow learning model can be used as initialization parameters of the current deep learning model, and the shallow learning model can be obtained through training based on historical sample data associated with the current streaming sample data.

It can be seen that in the technical solutions, when the current deep learning model is trained based on the current streaming sample data, the parameters of the trained shallow learning model are used as the initialization parameters of the current deep learning model, so that convergence of the deep learning model can be accelerated to efficiently finish a model training process, and performance of the deep learning model can also be improved.

In addition, in the technical solutions, the deep learning model is trained based on the streaming sample data, so that no training data set needs to be prepared in advance, thereby effectively saving storage space.

In some cases, data may show a phenomenon of concept shift, that is, the statistical characteristic of the data may change in an unforeseeable way over time. In these cases, the deep learning model is trained based on the streaming sample data, so that the deep learning model can be adjusted in time as the data changes, thereby improving a prediction effect of the deep learning model and achieving good scalability.

In the present specification, a structure of the shallow learning model can be simpler than a structure of the deep learning model. For example, the shallow learning model can have no hidden layer, or have fewer hidden layers than the deep learning model.

For example, the shallow learning model can be a logistic regression (LR) model, and the deep learning model can have one or more hidden layers. In some cases, for ease of implementation, the deep learning model can be initially constructed as having one hidden layer.

The following describes the technical solutions in detail with reference to specific embodiments.

Figure 1:
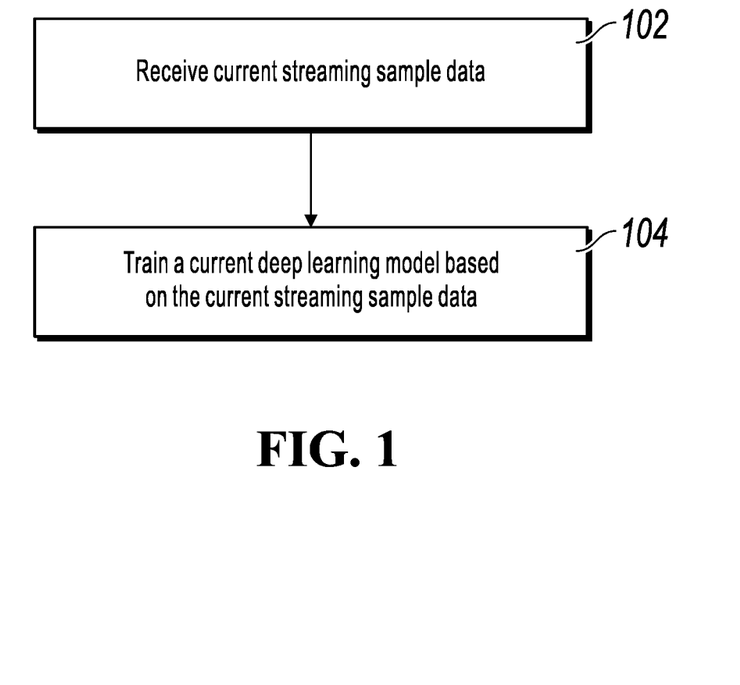
FIG. 1 is a schematic flowchart illustrating a method for trainings of learning models according to an embodiment.

FIG. 1 is a schematic flowchart illustrating a method for trainings of learning models according to an embodiment.

As shown in FIG. 1, in step 102, current streaming sample data can be received.

In step 104, a current deep learning model can be trained based on the current streaming sample data.

Parameters of a shallow learning model can be used as initialization parameters of the current deep learning model, and the shallow learning model can be obtained through training based on historical sample data associated with the current streaming sample data.

For example, the association between the historical sample data and the current streaming sample data can indicate that the historical sample data has one or more sample features that are the same as the current streaming sample data.

In an embodiment, the historical sample data can be historical streaming sample data before the current streaming sample data. For example, the historical streaming sample data may include one or more batches of streaming sample data before the current streaming sample data. In this case, the shallow learning model can be obtained through online training based on the historical streaming sample data.

In an embodiment, the historical sample data can be offline sample data associated with the current streaming sample data. For example, the offline sample data can be data having one or more sample features that are the same as the current streaming sample data. In this case, the shallow learning model can be obtained through offline training based on the offline sample data.

It can be seen that in the present specification, the shallow learning model can be obtained through training online or offline, to satisfy different application needs.

In an embodiment, when the parameters of the shallow learning model are used as the initialization parameters of the current deep learning model, parameters of layers of the shallow learning model can be used as initialization parameters of corresponding layers of the current deep learning model. For example, the parameters of the layers of the shallow learning model can be mapped to the corresponding layers of the current deep learning model in a one-to-one mapping way. It helps accelerate convergence of the deep learning model to shorten training time, and also helps improve performance of the deep learning model. In addition, parameters of the remaining layers of the current deep learning model can be initialized in a randomized way.

In an embodiment, in step 104, the current deep learning model can be trained by using various methods applicable to the art, such as online gradient descent.

In an embodiment, after the training of the current deep learning model is finished to obtain a trained deep learning model, performance of the trained deep learning model can be compared with performance of the current deep learning model.

For example, indicators used to evaluate performance can include various applicable indicators such as an area under curve (AUC), accuracy, coverage, and an F1 score, and are not limited in the present specification.

In response to determining that the performance of the trained deep learning model is improved compared to the performance of the current deep learning model, for example, AUC of the trained deep learning model is higher than AUC of the current deep learning model, the trained deep learning model can be used as the latest deep learning model; or in response to determining that the performance of the trained deep learning model is not improved compared to the performance of the current deep learning model, for example, AUC of the trained deep learning model is lower than or basically approximates to AUC of the current deep learning model, the current deep learning model can be considered to be updated.

For example, the quantity of hidden layers of the current deep learning model can be increased to obtain a deep learning model with the increased quantity of layers. For example, the quantity of hidden layers of the current deep learning model can be increased by 1 or more, which can be determined based on actual needs, etc.

Then, the deep learning model with the increased quantity of layers can be trained based on the current streaming sample data, to obtain a new deep learning model.

In an embodiment, the parameters of the shallow learning model can be used as initialization parameters of the deep learning model with the increased quantity of layers. It can help accelerate convergence of the deep learning model with the increased quantity of layers to efficiently obtain the new deep learning model, and also help improve performance of the new deep learning model.

Then, the latest deep learning model can be determined based on a result of performance comparison between the new deep learning model and the current deep learning model.

For example, in response to determining that the performance of the new deep learning model is improved compared to the performance of the current deep learning model, the new deep learning model can be used as the latest deep learning model; or in response to determining that the performance of the new deep learning model is not improved compared the performance of the current deep learning model, the current deep learning model can be used as the latest deep learning model.

It can be seen that in the previously described way, a current optimal deep learning model can be effectively selected as the latest deep learning model.

In an embodiment, the latest deep learning model can be directly used as the latest learning model to be applied.

Alternatively, in another embodiment, the latest deep learning model and the shallow learning model can be weighted to obtain the latest learning model to be applied.

For example, the latest deep learning model and the shallow learning model can respectively have corresponding weights. Their weights can be predefined, or can be defined by a user based on actual needs. For example, a weight of the latest deep learning model can be 70% and a weight of the shallow learning model can be 30%; or a weight of the latest deep learning model can be 100% and a weight of the shallow learning model can be 0. As such, the method is applicable to different application scenarios.

The following describes the technical solutions in the present specification with reference to specific examples. It is worthwhile to understand that these examples are merely intended to help a person skilled in the art better understand the embodiments, but are not intended to limit the scope thereof.

Figure 2A:
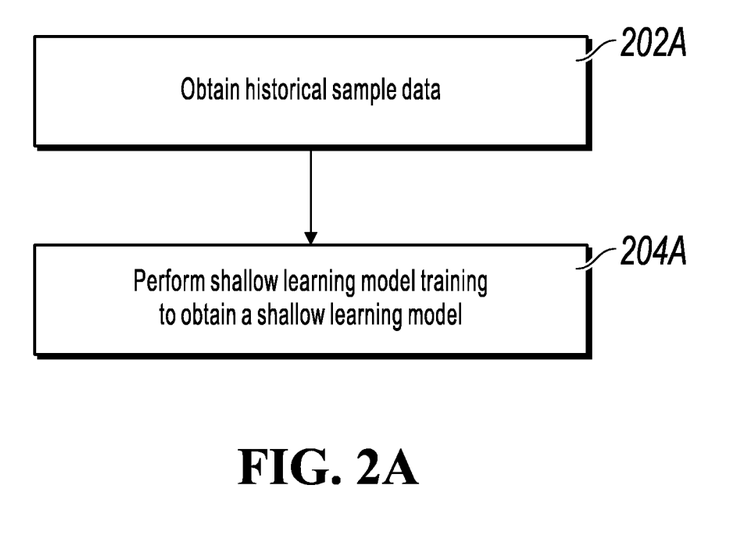
FIG. 2A illustrates an example training process of a shallow learning model according to an embodiment.

FIG. 2A illustrates an example training process of a shallow learning model according to an embodiment.

As shown in FIG. 2A, in step 202A, historical sample data can be obtained.

In step 204A, shallow learning model training can be performed based on the historical sample data to obtain a shallow learning model.

For example, the historical sample data can be one or more batches of streaming sample data before the previously described current streaming sample. In this case, shallow learning model training can be performed each time one batch of streaming sample data is received. As such, one or more batches of streaming sample data may be required to complete shallow learning model training online, to obtain the shallow learning model.

For another example, the historical sample data can be offline sample data associated with the previously described current streaming sample. In this case, shallow learning model training can be performed offline based on the offline sample data, to obtain the shallow learning model.

It can be understood that the process shown in FIG. 2A can occur before a training process of a deep learning model (i.e., the process shown in FIG. 2B), so that parameters of the shallow learning model can be used as initialization parameters of a deep learning model.

Figure 2B:
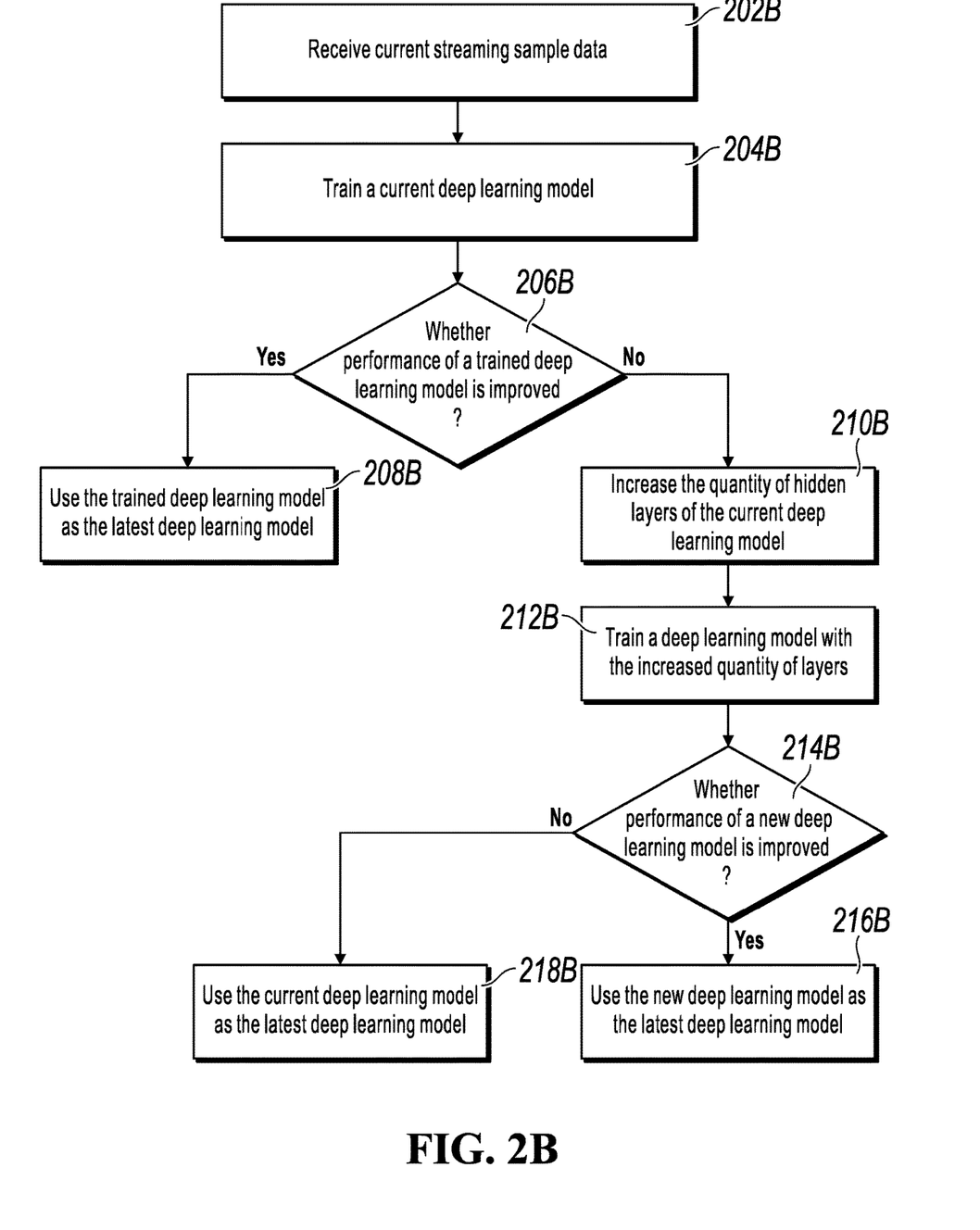
FIG. 2B illustrates an example training process of a deep learning model according to an embodiment.

FIG. 2B illustrates an example training process of a deep learning model according to an embodiment.

As shown in FIG. 2B, in step 202B, current streaming sample data can be received.

In step 204B, a current deep learning model can be trained based on the current streaming sample data, to obtain a trained deep learning model.

For example, during training, the current deep learning model can be first initialized. For example, parameters of layers of a shallow learning model can be obtained, and then the parameters of the layers of the shallow learning model can be used as initialization parameters of corresponding layers of the current deep learning model. Parameters of the remaining layers of the current deep learning model can be initialized in a randomized way.

In step 206B, it can be determined whether performance of the trained deep learning model is improved compared to performance of the current deep learning model.

In response to determining that the performance of the trained deep learning model is improved compared to the performance of the current deep learning model, in step 208B, the trained deep learning model can be used as the latest deep learning model; or in response to determining that the performance of the trained deep learning model is not improved compared to the performance of the current deep learning model, in step 210B, the quantity of hidden layers of the current deep learning model can be increased, for example, can be increased by 1 or more.

In step 212B, a deep learning model with the increased quantity of layers can be trained to obtain a new deep learning model.

For example, during training of the deep learning model with the increased quantity of layers, the parameters of the layers of the shallow learning model can be used as initialization parameters of corresponding layers of the deep learning model with the increased quantity of layers, and parameters of the remaining layers of the deep learning model with the increased quantity of layers can be initialized in a randomized way.

In step 214B, it can be determined whether performance of the new deep learning model is improved compared to the performance of the current deep learning model.

In response to determining that the performance of the new deep learning model is improved compared to the performance of the current deep learning model, in step 216B, the new deep learning model can be used as the latest deep learning model; or in response to determining that the performance of the new deep learning model is not improved compared to the performance of the current deep learning model, in step 218B, the current deep learning model can be used as the latest deep learning model.

It is worthwhile to understand that sequences of the steps shown in FIG. 2A and FIG. 2B are merely examples. The sequences of these steps can be changed correspondingly based on actual application or different design logic.

Figure 3:
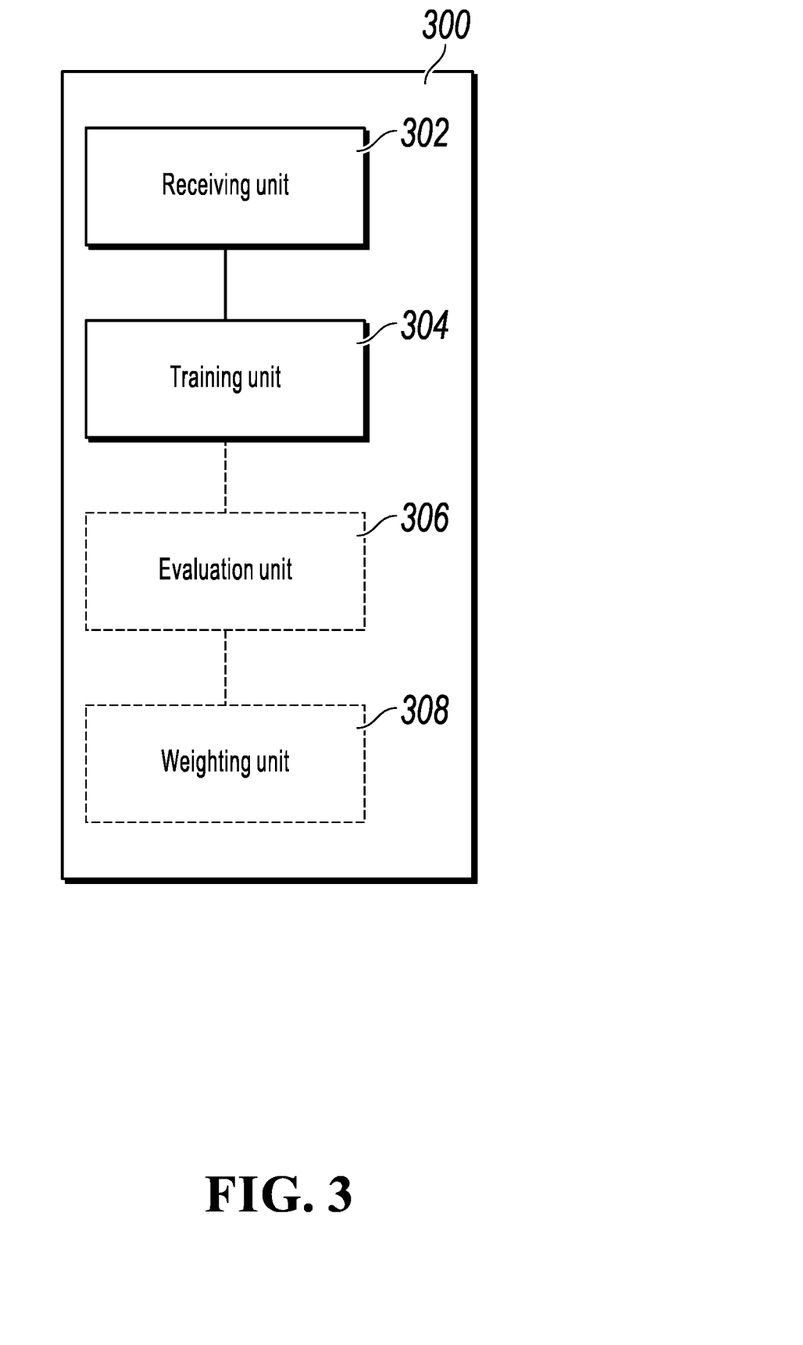
FIG. 3 is a schematic block diagram illustrating an apparatus for trainings of learning models according to an embodiment.

FIG. 3 is a schematic block diagram illustrating an apparatus for trainings of learning models according to an embodiment.

As shown in FIG. 3, an apparatus 300 can include a receiving unit 302 and a training unit 304.

The receiving unit 302 can be configured to receive current streaming sample data. The training unit 304 can be configured to train a current deep learning model based on the current streaming sample data. Parameters of a shallow learning model can be used as initialization parameters of the current deep learning model, and the shallow learning model can be obtained through training based on historical sample data associated with the current streaming sample data.

It can be seen that in the technical solutions, the parameters of the trained shallow learning model are used as the initialization parameters of the current deep learning model, so that when the current deep learning model is trained based on the current streaming sample data, convergence of the deep learning model can be accelerated to efficiently finish a model training process, and performance of the deep learning model can also be improved.

In an embodiment, the historical sample data can be historical streaming sample data before the current streaming sample data. In this case, the shallow learning model can be obtained through online training based on the historical streaming sample data.

In an embodiment, the historical sample data can be offline sample data. In this case, the shallow learning model can be obtained through offline training based on the offline sample data.

In an embodiment, the apparatus 300 can further include an evaluation unit 306.

After the training unit 304 finishes the training of the current deep learning model to obtain a trained deep learning model, the evaluation unit 306 can be configured to evaluate performance of the trained deep learning model.

In response to determining that the performance of the trained deep learning model is improved compared to performance of the current deep learning model, the evaluation unit 306 can be configured to use the trained deep learning model as the latest deep learning model; or in response to determining that the performance of the trained deep learning model is not improved compared to performance of the current deep learning model, the training unit 304 can be configured to increase the quantity of hidden layers of the current deep learning model to obtain a deep learning model with the increased quantity of layers, and the training unit 304 can be configured to train the deep learning model with the increased quantity of layers based on the current streaming sample data, to obtain a new deep learning model; and then the evaluation unit 306 can be configured to determine the latest deep learning model based on a result of performance comparison between the new deep learning model and the current deep learning model.

In an embodiment, the parameters of the shallow learning model can be used as initialization parameters of the deep learning model with the increased quantity of layers.

In an embodiment, in response to determining that performance of the new deep learning model is improved compared to the performance of the current deep learning model, the evaluation unit 306 can be configured to use the new deep learning model as the latest deep learning model; or in response to determining that performance of the new deep learning model is not improved compared to the performance of the current deep learning model, the evaluation unit 306 can be configured to use the current deep learning model as the latest deep learning model.

In an embodiment, the apparatus 300 can further include a weighting unit 308. The weighting unit 308 can be configured to weight the latest deep learning model and the shallow learning model to obtain the latest learning model.

The units of the apparatus 300 can perform corresponding steps in the method embodiments shown in FIG. 1 to FIG. 2B. Therefore, for brevity of description, specific operations and functions of the units of the apparatus 300 are not described here.

The apparatus 300 can be implemented by using hardware, software, or a combination of software and hardware. For example, when the apparatus 300 is implemented by using software, the apparatus 300 can be implemented by reading a corresponding executable instruction from a storage (for example, a non-volatile storage) to a memory by using a processor of a device that the apparatus 300 is located in.

Figure 4:
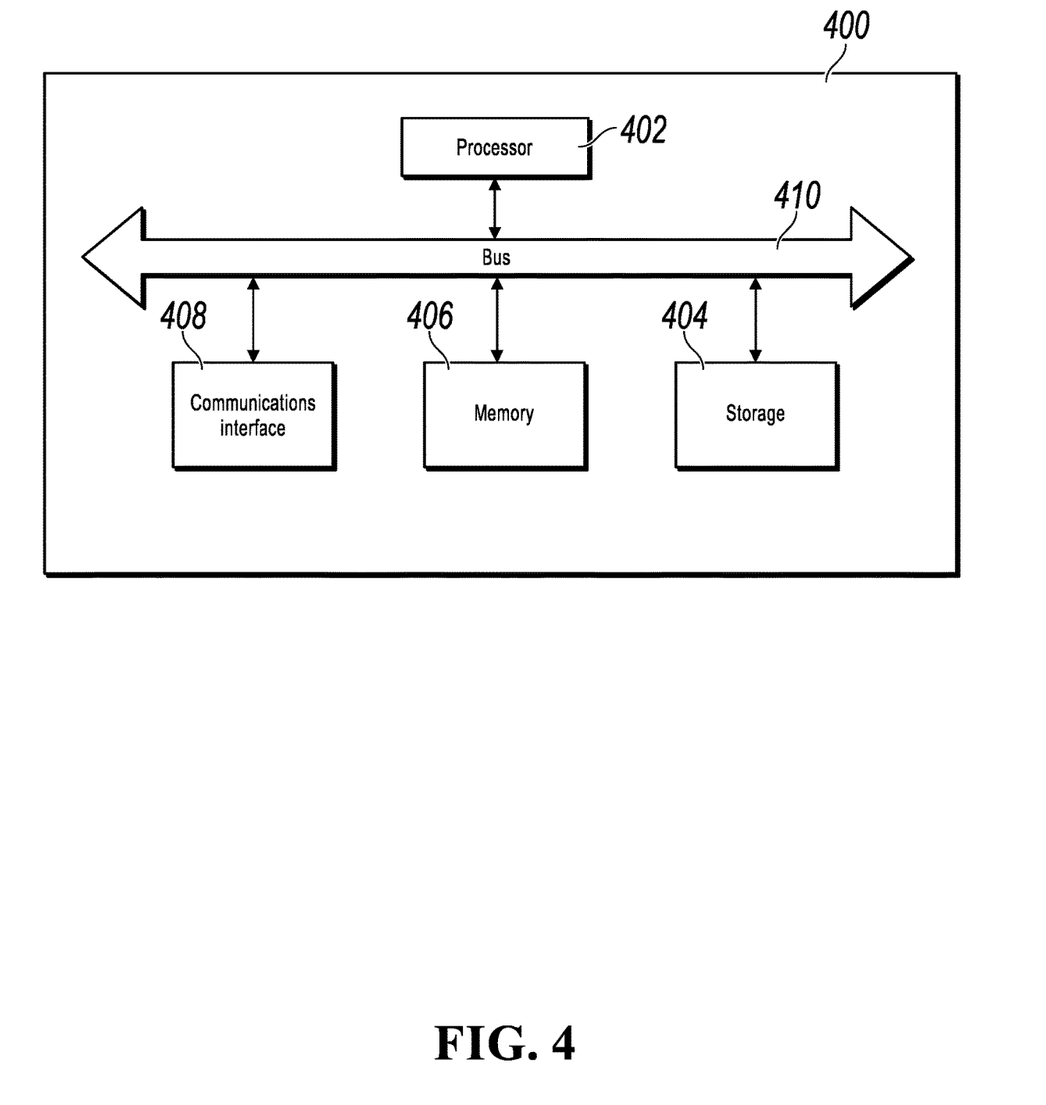
FIG. 4 is a hardware structural diagram illustrating a computing device for trainings of learning models according to an embodiment.

FIG. 4 is a hardware structural diagram illustrating a computing device for trainings of learning models according to an embodiment. As shown in FIG. 4, a computing device 400 can include at least one processor 402, a storage 404, a memory 406, and a communications interface 408, and the at least one processor 402, the storage 404, the memory 406, and the communications interface 408 are connected together via a bus 410. The at least one processor 402 executes at least one executable instruction (i.e., the previously described element implemented in a form of software) stored or coded in the storage 404.

In an embodiment, when the executable instruction stored in the storage 404 is executed by the at least one processor 402, the computing device is enabled to implement the processes previously described with reference to FIG. 1 to FIG. 2B.

The computing device 400 can be implemented in any form applicable to the art, for example, includes but is not limited to a desktop computer, a laptop computer, a smartphone, a tablet computer, a consumer electronic device, a wearable intelligent device, etc.

An embodiment of the present specification further provides a machine-readable storage medium. The machine-readable storage medium can store an executable instruction. When the executable instruction is executed by a machine, the machine is enabled to implement the specific processes of the method embodiments previously described with reference to FIG. 1 to FIG. 2B.

For example, the machine-readable storage medium can include but is not limited to a random access memory (Random Access Memory, RAM), a read-only memory (Read-Only Memory, ROM), an electrically-erasable programmable read-only memory (Electrically-Erasable Programmable Read-Only Memory, EEPROM), a static random access memory (Static Random Access Memory, SRAM), a hard disk, a flash memory, etc.

It is worthwhile to understand that the embodiments of the present specification are all described in a progressive way, for same or similar parts in the implementations, references can be made to each other, and each implementation focuses on a difference from the other embodiments. For example, the previously described apparatus embodiment, computing device embodiment, and machine-readable storage medium embodiment are basically similar to the method embodiments, and therefore are described relatively simple. For related parts, references can be made to some descriptions of the method embodiments.

The specific embodiments of the present specification are described above. Other embodiments fall within the scope of the appended claims. In some cases, the actions or steps described in the claims can be performed based on sequences different from the sequences in the embodiments and can still achieve the desired results. In addition, the processes depicted in the accompanying drawings do not necessarily require the shown particular sequences or orders to achieve the desired results. In some implementations, multi-task processing and parallel processing can or may be advantageous.

It is worthwhile to understand that, for a person of ordinary skill in the art, various modifications to the embodiments in the present specification will be clear, and the general principle described here can be applied to other variants without departing from the protection scope of the claims.

What is claimed is:

1. A method for trainings of learning models, comprising:
receiving current streaming sample data; and
training a current deep learning model based on the current streaming sample data, the training comprising:
before training the current deep learning model that includes a structure of layers, each of the layers being parameters of the current deep learning model, training a shallow learning model that is a separate machine learning model from the current deep learning model, and the shallow learning model has a structure of layers that is simpler than the structure of layers of the current deep learning model, each of the layers of the shallow learning model being parameters of the shallow learning model, through training based on historical sample data associated with the current streaming sample data; and
after the training of the shallow learning model is completed to obtain the parameters of the layers of the shallow learning model, initializing parameters of the layers of the current deep learning model as the parameters of the layers of the shallowing learning model.

2. The method according to claim 1, wherein the historical sample data comprises historical streaming sample data received before the current streaming sample data, and wherein the shallow learning model is obtained through online training based on the historical streaming sample data.

3. The method according to claim 1, wherein the historical sample data comprises offline sample data, and wherein the shallow learning model is obtained through offline training based on the offline sample data.

4. The method according to claim 1, wherein a trained deep learning model is obtained after training the current deep learning model, and wherein the method comprises:
in response to determining that performance of the trained deep learning model is improved compared to performance of the current deep learning model, using the trained deep learning model as a latest deep learning model; or
in response to determining that performance of the trained deep learning model is not improved compared to performance of the current deep learning model:
increasing a quantity of hidden layers of the current deep learning model to obtain a deep learning model with increased quantity of layers;
obtaining a new deep learning model by training the deep learning model with increased quantity of layers based on the current streaming sample data; and
determining the latest deep learning model based on a result of performance comparison between the new deep learning model and the current deep learning model.

5. The method according to claim 4, wherein the parameters of the shallow learning model are used as initialization parameters of the deep learning model with increased quantity of layers.

6. The method according to claim 4, wherein determining the latest deep learning model comprises:
in response to determining that performance of the new deep learning model is improved compared to the performance of the current deep learning model, using the new deep learning model as the latest deep learning model; or
in response to determining that performance of the new deep learning model is not improved compared to the performance of the current deep learning model, using the current deep learning model as the latest deep learning model.

7. The method according to claim 4, comprising:
weighting the latest deep learning model and the shallow learning model to obtain a latest learning model.

8. A non-transitory, computer-readable medium storing one or more instructions executable by a computer system to perform operations comprising:
receiving current streaming sample data; and
training a current deep learning model based on the current streaming sample data, the training comprising:
before training the current deep learning model that includes a structure of layers, each of the layers being parameters of the current deep learning model, training a shallow learning model that is a separate machine learning model from the current deep learning model, and the shallow learning model has a structure of layers that is simpler than the structure of layers of the current deep learning model, each of the layers of the shallow learning model being parameters of the shallow learning model, through training based on historical sample data associated with the current streaming sample data; and
after the training of the shallow learning model is completed to obtain the parameters of the layers of the shallow learning model, initializing parameters of the layers of the current deep learning model as the parameters of the layers of the shallowing learning model.

9. The non-transitory, computer-readable medium according to claim 8, wherein the historical sample data comprises historical streaming sample data received before the current streaming sample data, and wherein the shallow learning model is obtained through online training based on the historical streaming sample data.

10. The non-transitory, computer-readable medium according to claim 8, wherein the historical sample data comprises offline sample data, and wherein the shallow learning model is obtained through offline training based on the offline sample data.

11. The non-transitory, computer-readable medium according to claim 8, wherein a trained deep learning model is obtained after training the current deep learning model, and wherein the operations comprise:
in response to determining that performance of the trained deep learning model is improved compared to performance of the current deep learning model, using the trained deep learning model as a latest deep learning model; or
in response to determining that performance of the trained deep learning model is not improved compared to performance of the current deep learning model:
increasing a quantity of hidden layers of the current deep learning model to obtain a deep learning model with increased quantity of layers;
obtaining a new deep learning model by training the deep learning model with increased quantity of layers based on the current streaming sample data; and determining the latest deep learning model based on a result of performance comparison between the new deep learning model and the current deep learning model.

12. The non-transitory, computer-readable medium according to claim 11, wherein the parameters of the shallow learning model are used as initialization parameters of the deep learning model with increased quantity of layers.

13. The non-transitory, computer-readable medium according to claim 11, wherein determining the latest deep learning model comprises:
in response to determining that performance of the new deep learning model is improved compared to the performance of the current deep learning model, using the new deep learning model as the latest deep learning model; or
in response to determining that performance of the new deep learning model is not improved compared to the performance of the current deep learning model, using the current deep learning model as the latest deep learning model.

14. The non-transitory, computer-readable medium according to claim 11, the operations comprising:
weighting the latest deep learning model and the shallow learning model to obtain a latest learning model.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving current streaming sample data; and
training a current deep learning model based on the current streaming sample data, the training comprising:
before training the current deep learning model that includes a structure of layers, each of the layers being parameters of the current deep learning model, training a shallow learning model that is a separate machine learning model from the current deep learning model, and the shallow learning model has a structure of layers that is simpler than the structure of layers of the current deep learning model, each of the layers of the shallow learning model being parameters of the shallow learning model, through training based on historical sample data associated with the current streaming sample data; and
after the training of the shallow learning model is completed to obtain the parameters of the layers of the shallow learning model, initializing parameters of the layers of the current deep learning model as the parameters of the layers of the shallowing learning model.

16. The computer-implemented system according to claim 15, wherein the historical sample data comprises historical streaming sample data received before the current streaming sample data, and wherein the shallow learning model is obtained through online training based on the historical streaming sample data.

17. The computer-implemented system according to claim 15, wherein the historical sample data comprises offline sample data, and wherein the shallow learning model is obtained through offline training based on the offline sample data.

18. The computer-implemented system according to claim 15, wherein a trained deep learning model is obtained after training the current deep learning model, and wherein the operations comprise:
in response to determining that performance of the trained deep learning model is improved compared to performance of the current deep learning model, using the trained deep learning model as a latest deep learning model; or
in response to determining that performance of the trained deep learning model is not improved compared to performance of the current deep learning model:
increasing a quantity of hidden layers of the current deep learning model to obtain a deep learning model with increased quantity of layers;
obtaining a new deep learning model by training the deep learning model with increased quantity of layers based on the current streaming sample data; and
determining the latest deep learning model based on a result of performance comparison between the new deep learning model and the current deep learning model.

19. The computer-implemented system according to claim 18, wherein the parameters of the shallow learning model are used as initialization parameters of the deep learning model with increased quantity of layers.

20. The computer-implemented system according to claim 18, wherein determining the latest deep learning model comprises:
in response to determining that performance of the new deep learning model is improved compared to the performance of the current deep learning model, using the new deep learning model as the latest deep learning model; or
in response to determining that performance of the new deep learning model is not improved compared to the performance of the current deep learning model, using the current deep learning model as the latest deep learning model.

\* \* \* \* \*